United States Patent
Ori

(10) Patent No.: US 7,046,452 B2
(45) Date of Patent: May 16, 2006

(54) THREE-GROUP ZOOM LENS

(75) Inventor: Tetsuya Ori, Koshigaya (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/936,770

(22) Filed: Sep. 9, 2004

(65) Prior Publication Data
US 2005/0057817 A1 Mar. 17, 2005

(30) Foreign Application Priority Data
Sep. 11, 2003 (JP) .............................. 2003-319490

(51) Int. Cl.
G02B 15/14 (2006.01)
(52) U.S. Cl. ...................................... 359/689; 359/680
(58) Field of Classification Search ........ 359/680–682, 359/689
See application file for complete search history.

(56) References Cited

U.S. PATENT DOCUMENTS 6,618,210 B1 * 9/2003 Noguchi et al. ............ 359/689
6,757,111 B1 * 6/2004 Takeuchi et al. ............ 359/784
6,781,768 B1 * 8/2004 Minefuji ..................... 359/689

FOREIGN PATENT DOCUMENTS

| JP | 10-133115 | 5/1998 |
| JP | 2001-296476 | 10/2001 |
| JP | 2003-35868 | 2/2003 |

* cited by examiner

Primary Examiner—Scott J. Sugarman
Assistant Examiner—M. Hasan
(74) Attorney, Agent, or Firm—Arnold International; Jon W. Henry; Bruce Y. Arnold

(57) ABSTRACT

A three-group zoom lens includes, in order from the object side, first, second and third lens groups having negative, positive and positive refractive power, respectively. During zooming from the wide-angle end to the telephoto end, the second lens group moves monotonically toward the object side while moving closer to the first lens group and farther from the third lens group, and the first and third lens groups reverse directions to define curved paths. The third lens group is closer to the object side at the wide-angle end and moves toward the object side for close focusing. The focal lengths of the zoom lens and its lens groups, the zoom ratio, the length of the zoom lens, and the half-field angle at the wide-angle end satisfy certain conditions in order to achieve a zoom ratio of at least three with favorable correction of aberrations.

20 Claims, 3 Drawing Sheets

THREE-GROUP ZOOM LENS

BACKGROUND OF THE INVENTION

In digital cameras that have been rapidly becoming popular in recent years, three-group lenses are used for achieving miniaturization and improving aberration correction. Frequently used are rear-focus type three-group zoom lenses that provide closer focusing by moving the third lens group from the object side toward the image side. Japanese Laid-Open Patent Application H10-133115, Japanese Laid-Open Patent Application 2001-296476, and Japanese Laid-Open Patent Application 2003-035868 are exemplary publications that disclose such three-group zoom lenses.

The three-group zoom lens described in Japanese Laid-Open Patent Application H10-133115 includes, in order from the object side, a first lens group having negative refractive power, a second lens group having positive refractive power and an aperture stop, and a third lens group having positive refractive power. During zooming from the wide-angle end toward the telephoto end, the first lens group moves first toward the image side and then toward the object side so that the locus of points of the position of the first lens group along the optical axis between the wide-angle end and the telephoto end, as viewed in cross-section including the optical axis, follows an arc that is convex toward the image side, the second lens group moves monotonically toward the object side, and the third lens group moves first toward the object side and then toward the image side so that the locus of points of the position of the third lens group along the optical axis between the wide-angle end and the telephoto end, as viewed in cross-section including the optical axis, follows an arc that is convex toward the object side.

The three-group zoom lens described in Japanese Laid-Open Patent Application 2001-296476 includes, in order from the object side, a first lens group having negative refractive power, a second lens group having positive refractive power, and a third lens group having positive refractive power. During zooming from the wide-angle end toward the telephoto end, the third lens group moves monotonically toward the image side or moves in an arc that is convex toward the image side by first moving toward the image side and then moving away from the image side.

Although conventional zoom lenses have been designed in order to achieve greater miniaturization, a larger zoom ratio, and a higher resolution, in recent years even greater miniaturization, larger zoom ratio, and higher resolution have been desired.

Also, in the three-group zoom lens described in Japanese Laid-Open Patent Application H10-133115, the absolute value of the ratio of the focal length of the first lens group divided by the focal length of the entire zoom lens is about 2.4 to 2.6. Although it can satisfy the demands of miniaturization, zoom ratio, and resolution up to a zoom ratio of about three, when the zoom ratio exceeds three, the total length of the zoom lens increases so much that it does not satisfy the demands for miniaturization.

Additionally, in the three-group zoom lens described in Japanese Laid-Open Patent Application 2001-296476, because the third lens group moves monotonically toward the image side or moves in an arc that is convex toward the image side as discussed above, although it can satisfy the demands of miniaturization, high zoom ratio and higher resolution up to a zoom ratio of about three, when the zoom ratio exceeds three, correction of curvature of field at intermediate focal lengths becomes difficult.

BRIEF SUMMARY OF THE INVENTION

The present invention relates to three-group zoom lenses for imaging devices, such as digital cameras and video cameras that use an image pickup element such as a CCD or CMOS, and achieves minaturization and higher resolution with a zoom ratio greater than three.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
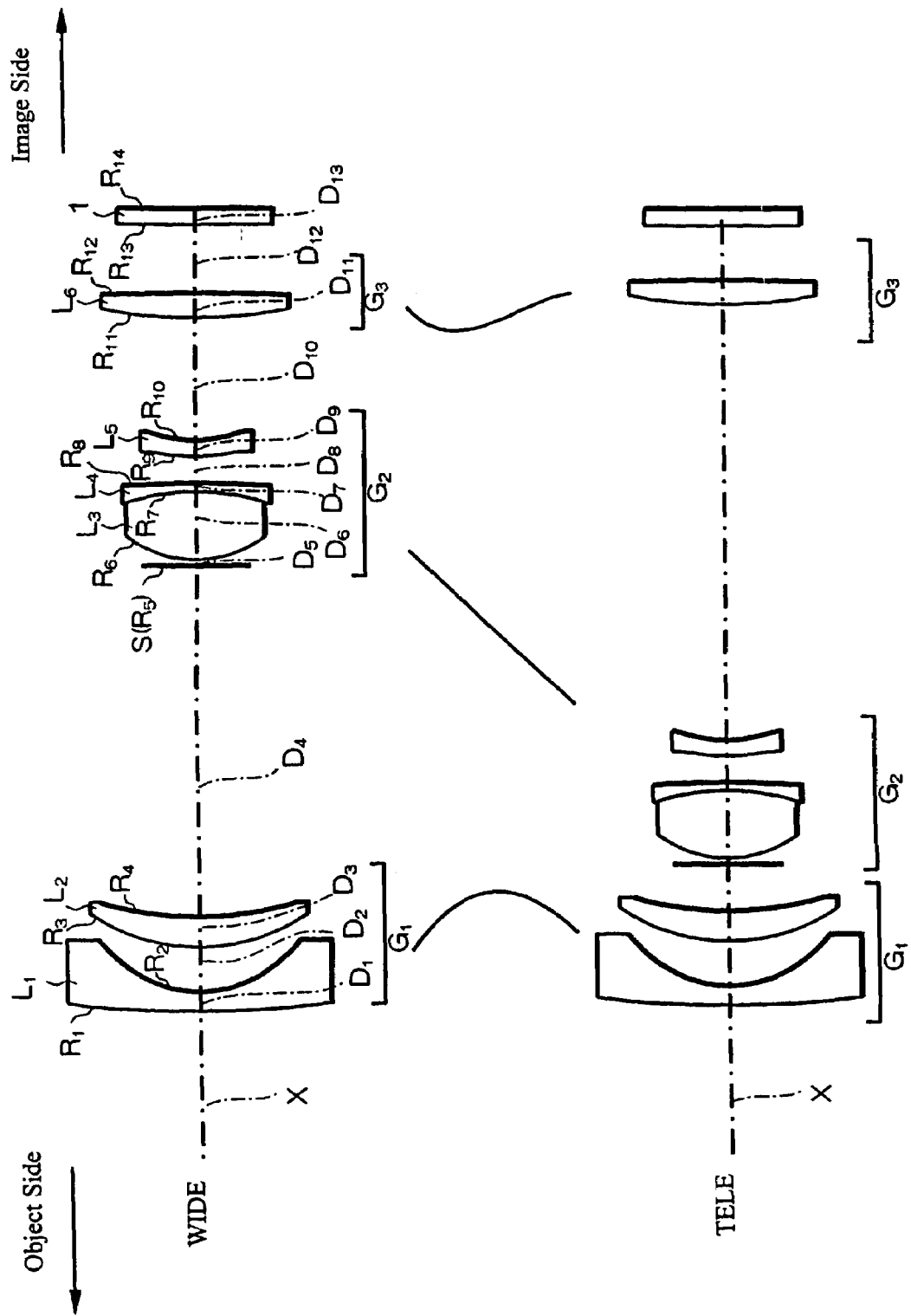
FIG. 1 shows cross-sectional views of the zoom lens according to Embodiment 1 at the wide-angle end (WIDE) and at the telephoto end (TELE)

A general description of the three-group zoom lens of the: present invention that pertains to the two disclosed embodiments of the invention will first be described with reference to FIG. 1 that shows Embodiment 1. In FIG. 1, lens elements are referenced by the letter L with a subscript denoting their order from the object side of the zoom lens along the optical axis X, from $L_1$ to $L_6$. Similarly, radii of curvature of the optical surfaces are referenced by the letter R with a subscript denoting their order from the object side of the zoom lens, from $R_1$ to $R_{14}$. The on-axis surface spacings along the optical axis X of the various optical surfaces are referenced by the letter D with a subscript denoting their order from the object side of the zoom lens, from $D_1$ to $D_{13}$. In the same manner, the three groups are labeled $G_1$ to $G_3$ in order from the object side of the zoom lens and the lens elements belonging to each lens group are indicated by brackets adjacent the labels $G_1$ to $G_3$.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

The top portion of FIG. 1 shows the zoom lens at the wide-angle end of the zoom range and the bottom portion of FIG. 1 shows the zoom lens at the telephoto end of the zoom range. As shown in FIG. 1, the zoom lens is a three-group zoom lens that includes, arranged along the optical axis X in order from the object side, a first lens group $G_1$ of negative refractive power, a second lens group $G_2$ of positive refractive power, and a third lens group $G_3$ of positive refractive power. The second lens group $G_2$ includes a stop S that operates as an aperture stop to control the amount of light that passes through the zoom lens. In FIG. 1, a horizontal arrow below the label "Object side" points in one direction in order to indicate the object side of the zoom lens and a horizontal arrow below the label "Image side" points in the opposite direction in order to indicate the image side of the zoom lens. A filter unit 1 is on the image side of the third lens group $G_3$ and includes a low-pass filter and an infrared cut-off filter for controlling the light flux to an image plane (not shown) where an image pickup element, such as a CCD, may be located.

During zooming from the wide-angle end to the telephoto end, all three lens groups $G_1$–$G_3$ move as follows. As shown in FIG. 1, the first lens group $G_1$ moves monotonically closer to the second lens group $G_2$ and the second lens group $G_2$ moves monotonically toward the object side. In FIG. 1, a line that is concave toward the object side extends between the positions of the first lens group $G_1$ in the upper and lower portions of FIG. 1 in order to indicate the locus of points of movement of the first lens group $G_1$, as seen in the cross-sections that include the optical axis X, during zooming between the wide-angle end and the telephoto end. Similarly, a straight line between the positions of the second lens group $G_2$ in the upper and lower portions of FIG. 1 indicates the locus of points of movement of the second lens group $G_2$ toward the object side during zooming from the wide-angle end to the telephoto end. Additionally, a line that is convex toward the object side between the upper and lower portions of FIG. 1 indicates the locus of points of movement of the third lens group $G_3$ during zooming between the wide-angle end and the telephoto end. As indicated by these lines in FIG. 1, during zooming from the wide-angle end to the telephoto end, the distance between the first lens group $G_1$ and the second lens group $G_2$ decreases, and the distance between the second lens group $G_2$ and the third lens group $G_3$ increases. Both lens groups $G_1$ and $G_3$ reverse their directions of movement along the optical axis X while zooming between the wide-angle end and the telephoto end of the zoom range. Also, with the zoom lens focused at infinity during zooming, the third lens group $G_3$ at the wide-angle end is positioned nearer the object side than its position at the telephoto end.

Furthermore, when focusing from infinity to close range, the third lens group $G_3$ moves toward the object side. In this way, by moving three lens groups $G_1$, $G_2$, and $G_3$ along the optical axis X, the focal length f of the entire zoom lens can be varied, and the light flux can be condensed efficiently on an image plane.

The first lens group $G_1$ includes, in order from the object side, a first lens element $L_1$ having negative refractive power, at least one aspheric surface, and a concave image-side surface of greater curvature (i.e., smaller radius of curvature) than its object-side surface, and a second lens element $L_2$ having positive refractive power, a meniscus shape, and a convex object-side surface of greater curvature than its image-side surface. By the first lens group $G_1$ having this construction, curvature of field, distortion, and other aberrations can be favorably corrected and the length of the entire zoom lens, including its length in a retracted position, can be reduced to achieve desired miniaturization while achieving high resolution.

The second lens group $G_2$ includes, in order from the object side, the stop S, a biconvex third lens element $L_3$, a fourth lens element $L_4$ having negative refractive power and a concave object-side surface of greater curvature than its image-side surface, and a fifth lens element $L_5$ having negative refractive power and at least one aspheric surface. The third lens element $L_3$ and the fourth lens element $L_4$ are joined together to form a lens component. By the second lens group $G_2$ having this construction, spherical aberration can be favorably corrected, and the length of the entire zoom lens, including its length in a retracted position, can be reduced to achieve desired miniaturization while achieving high resolution.

The third lens group $G_3$ includes a sixth lens element $L_6$ having positive refractive power and at least one aspheric surface. By the third lens group $G_3$ having this construction, the length of the entire zoom lens, including its length in a retracted position, can be reduced to achieve desired miniaturization while suppressing variations in aberrations during zooming.

The lens surfaces that are aspheric are expressed by the following equation:

$$Z=(Y^2/R)/[1+(1-K \cdot Y^2/R^2)^{1/2}]+\Sigma((A_i \cdot Y^i)) \qquad \text{Equation (A)}$$

where
- Z is the length (in mm) of a line drawn from a point on the aspheric lens surface at a distance Y from the optical axis to the tangential plane of the aspheric surface vertex,
- R is the radius of curvature of the aspheric lens surface on the optical axis,
- Y is the distance (in mm) from the optical axis,
- K is the eccentricity, and
- $A_i$ is the ith aspheric coefficient and the summation extends over i.

In embodiments of the invention disclosed below, the aspheric coefficients $A_3$–$A_{10}$ are non-zero. That is, the non-zero terms of low order are not merely the even-order terms of low order as in conventional aspheric surfaces but also odd-order terms are used for defining the aspheric shape because of the recent demand for higher resolution. This has been made possible by the faster processing speeds now common in computers. By employing aspheric coefficients including the odd-order terms using the faster processing speeds now available in computers, because the number of parameters used to determine the aspheric shape increases, it becomes possible to determine the shape of the central region containing the optical axis of an aspheric lens surface and the peripheral region of the aspheric surface independently from each other so that both the central region and the peripheral region can be formed into shapes that assist in better aberration correction.

Preferably the three-group zoom lens of the present invention satisfies the following Conditions (1)–(3):

$$2.0 < |f_1|/f_w < 2.4 \quad \text{Condition (1)}$$

$$0.29 < f_2/f_3 < 0.37 \quad \text{Condition (2)}$$

$$2.7 < LT/(f_w \cdot Z \cdot \tan \omega) < 3.3 \quad \text{Condition (3)}$$

where $f_w$ is the focal length of the entire zoom lens at the wide-angle end, $f_1$ is the focal length of the first lens group $G_1$, $f_2$ is the focal length of the second lens group $G_2$, $f_3$ is the focal length of the third lens group $G_3$, LT is the distance along the optical axis from the object-side surface of the first lens group to the image plane of the zoom lens at the telephoto end;

Z is the zoom ratio (the ratio of the focal length of the entire zoom lens at the telephoto end to the focal length of the entire zoom lens at the wide-angle end), and ω is the half-field angle at the wide-angle end (the half-angle of view at the maximum image height at the wide-angle end).

By satisfying Conditions (1) and (2), curvature of field can be favorably corrected while achieving miniaturization. If the lower limits of Conditions (1) and (2) are not satisfied, although miniaturization can be achieved, it becomes difficult to well correct the curvature of field. On the other hand, if upper limits of Conditions (1) and (2) are not satisfied, although curvature of field can be favorably corrected, achieving miniaturization becomes difficult. Condition (3) similarly applies to zoom lenses with a zoom ratio of three or greater with regard to correcting the curvature of field and other aberrations.

Embodiments 1 and 2 of the present invention will now be individually described with further reference to the drawings.

EMBODIMENT 1

In Embodiment 1, as shown in FIG. 1, the first lens group $G_1$ is formed of, in order from the object side, a first lens element $L_1$ of negative refractive power and a meniscus shape with its image-side surface being concave and having a greater curvature than its object-side surface, and a second lens element $L_2$ of positive refractive power and a meniscus shape with its object-side surface being convex and having a greater curvature than its image-side surface.

The second lens group $G_2$ is formed of, in order from the object side, a stop S, a third lens element $L_3$ that is biconvex, a fourth lens element $L_4$ of negative refractive power and having a meniscus shape with its object-side surface being concave and having a greater curvature than its image-side surface, and a fifth lens element $L_5$ of negative refractive power and having a meniscus shape with its convex surface on the object side. The lens element $L_3$ and the lens element $L_4$ are joined together to form a lens component.

The third lens group $G_3$ is formed of a biconvex sixth lens element $L_6$.

Both surfaces of lens elements $L_1$, $L_5$, and $L_6$ are aspheric surfaces with aspheric surface shapes expressed by Equation (A) above including both even-order and odd-order non-zero terms.

Table 1 below lists numerical values of lens data for Embodiment 1. Table 1 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 1. Listed in the bottom portion of Table 1 are the focal length f and the f-number $F_{NO}$ at the wide-angle and telephoto ends, and the maximum field angle 2ω at the wide-angle end and the telephoto end for Embodiment 1.

TABLE 1

| # | R | D | $N_d$ | $\nu_d$ |
|---|---|---|---|---|
| 1* | 104.7414 | 1.30 | 1.80348 | 40.4 |
| 2* | 7.0001 | 3.02 | | |
| 3 | 11.8143 | 2.05 | 1.92286 | 20.9 |
| 4 | 21.5413 | $D_4$ (variable) | | |
| 5 | ∞ (stop) | 0.40 | | |
| 6 | 7.1369 | 4.51 | 1.58913 | 61.2 |
| 7 | −14.1000 | 0.55 | 1.84666 | 23.8 |
| 8 | −63.9180 | 1.75 | | |
| 9* | 10.7864 | 1.05 | 1.68458 | 30.9 |
| 10* | 7.4718 | $D_{10}$ (variable) | | |
| 11* | 30.0271 | 1.64 | 1.56865 | 58.6 |
| 12* | −219.3569 | $D_{12}$ (variable) | | |
| 13 | ∞ | 1.08 | 1.51680 | 64.2 |
| 14 | ∞ | | | | f = 7.5–27.5 mm  $F_{NO}$ = 2.9–6.0  2ω = 68.9°–19.8°

The lens surfaces with a * to the right of the surface number in Table 1 are aspheric lens surfaces, and the aspheric surface shape of these lens surfaces is expressed by Equation (A) above.

Table 2 below lists the values of the constant K, and the coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | 1.0362103 | −6.0583379E−4 | 4.0174116E−4 | 1.4730508E−4 | −1.2629818E−4 |
| 2 | −1.7614660 | −6.0238634E−4 | 1.3114492E−3 | 1.0015586E−4 | −1.0377569E−4 |
| 9 | 8.1469301 | −1.8330303E−3 | −6.7162676E−4 | −2.4443340E−4 | −2.3407670E−4 |
| 10 | −6.1871509 | −2.5314989E−3 | 3.9248926E−3 | −1.3206635E−3 | 1.8171921E−4 |
| 11 | 1.0263360 | −4.3344289E−3 | 1.7373363E−3 | 5.3891898E−5 | −2.0677963E−4 |
| 12 | 0.9832135 | −5.4290344E−3 | 3.6620029E−3 | −1.2511728E−3 | 2.4238233E−4 |

TABLE 2-continued

| # | $A_7$ | $A_8$ | $A_9$ | $A_{10}$ |
|---|---|---|---|---|
| 1 | 3.2022613E−5 | −3.9131878E−6 | 2.3608273E−7 | −5.6498884E−9 |
| 2 | 1.5186198E−5 | 6.0789718E−7 | −2.7421593E−7 | 1.5088000E−8 |
| 9 | 7.2735733E−5 | −3.9351025E−6 | −1.2144146E−6 | −1.9886882E−7 |
| 10 | −1.0381765E−5 | 1.0167000E−6 | −1.8806586E−7 | −2.4605965E−8 |
| 11 | 4.9374395E−5 | −2.4986445E−6 | −3.7585794E−7 | 3.3987733E−8 |
| 12 | −2.7369776E−5 | 1.3461870E−6 | 1.7729211E−7 | −2.6259422E−8 |

In the zoom lens of Embodiment 1, the first lens group $G_1$, the second lens group $G_2$, and the third lens group $G_3$ move during zooming. Therefore, the on-axis spacing $D_4$ between lens groups $G_1$ and $G_2$, the on-axis spacing $D_{10}$ between lens groups $G_2$ and $G_3$, and the on-axis spacing $D_{12}$ between the lens group $G_3$ and the filter unit 1 change with zooming. Table 3 below lists the values of the focal length f and the on-axis surface spacing $D_4$, the on-axis surface spacing $D_{10}$, and the on-axis surface spacing $D_{12}$ at the wide-angle end (f=7.5 mm), at an intermediate zoom position (f=14.3 mm), and at the telephoto end (f=27.5 mm).

TABLE 3

| f | $D_4$ | $D_{10}$ | $D_{12}$ |
|---|---|---|---|
| 7.5 | 23.36 | 8.21 | 4.59 |
| 14.3 | 9.27 | 13.48 | 6.30 |
| 27.5 | 3.03 | 29.21 | 3.66 |

The zoom lens of Embodiment 1 of the present invention satisfies Conditions (1)–(3) above as set forth in Table 4 below.

TABLE 4

| Condition No. | Condition | Values |
|---|---|---|
| (1) | $2.0 < |f_1|/f_w < 2.4$ | 2.22 |
| (2) | $0.29 < f_2/f_3 < 0.37$ | 0.32 |
| (3) | $2.7 < LT/(f_w \cdot Z \cdot \tan\omega) < 3.3$ | 2.82 |

Figure 2A:
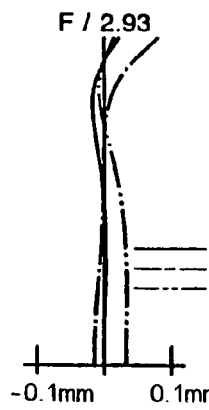
FIGS. 2A–2D show the spherical aberration, astigmatism, distortion, and lateral color, respectively, of the zoom lens according to Embodiment 1 at the wide-angle end.
Figure 2B:
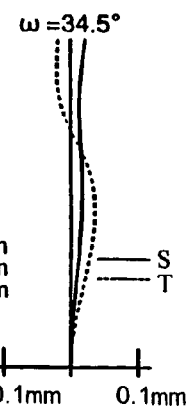
Figure 2C:
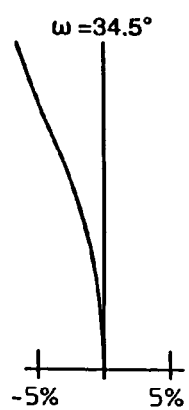
Figure 2D:
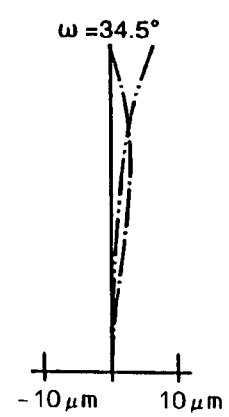
Figure 2E:
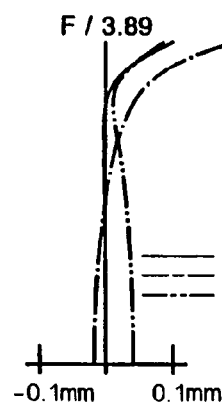
FIGS. 2E–2H show the spherical aberration, astigmatism, distortion, and lateral color, respectively, of the zoom lens according to Embodiment 1 at an intermediate position.
Figure 2F:
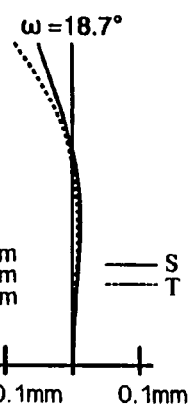
Figure 2G:
Figure 2H:
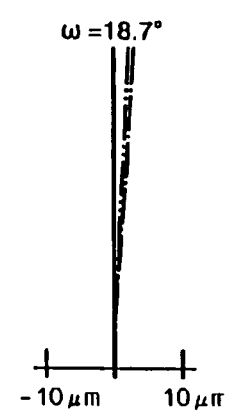
Figure 2I:
FIGS. 2I–2L show the spherical aberration, astigmatism, distortion, and lateral color, respectively, of the zoom lens according to Embodiment 1 at the telephoto end.
Figure 2J:
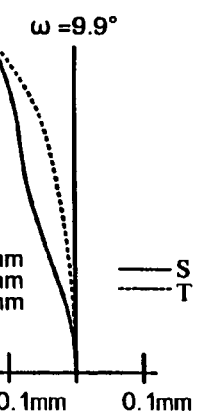
Figure 2K:
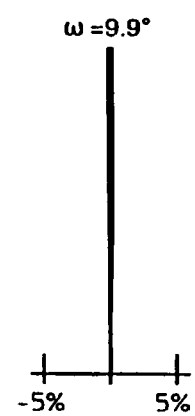
Figure 2L:
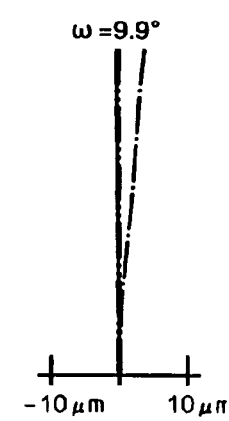

FIGS. 2A–2D show the spherical aberration, astigmatism, distortion, and lateral color, respectively, of the zoom lens of Embodiment 1 at the wide-angle end. FIGS. 2E–2H show the spherical aberration, astigmatism, distortion, and lateral color, respectively, of the zoom lens of Embodiment 1 at an intermediate position, and FIGS. 2I–2L show the spherical aberration, astigmatism, distortion, and lateral color, respectively, of the zoom lens of Embodiment 1 at the telephoto end. In FIGS. 2A, 2E, and 2I, the spherical aberration is shown for the wavelengths 587.6 nm (the d-line), 460 nm and 615 nm. In the remaining figures, ω is the half-field angle. In FIGS. 2B, 2F and 2J, the astigmatism is shown for the sagittal image surface S and the tangential image surface T. In FIGS. 2C, 2G and 2K, distortion is measured at 587.6 nm (the d-line). In FIGS. 2D, 2H and 2L, the lateral color is shown for the wavelengths 460 nm and 615 nm relative to 587.6 nm (the d-line). As is apparent from these figures, the various aberrations are favorably corrected over the entire range of zoom.

EMBODIMENT 2

Embodiment 2 is very similar to Embodiment 1 and therefore only the differences between Embodiment 2 and Embodiment 1 will be explained. Embodiment 2 differs from Embodiment 1 in that in Embodiment 2, the first lens element $L_1$ has a biconcave shape near the optical axis. Also, Embodiment 2 differs from Embodiment 1 in its lens element configuration by having different radii of curvature of the lens surfaces and different aspheric coefficients of the aspheric lens surfaces, as well as by having some different optical element surface spacings and by using some different refractive materials.

Table 5 below lists numerical values of lens data for Embodiment 2. Table 5 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 2. Listed in the bottom portion of Table S are the focal length f and the f-number $F_{NO}$ at the wide-angle and telephoto ends, and the maximum field angle 2ω at the wide-angle end and the telephoto end for Embodiment 2.

TABLE 5

| # | R | D | $N_d$ | $\nu_d$ |
|---|---|---|---|---|
| 1* | −76.2814 | 1.30 | 1.80348 | 40.4 |
| 2* | 7.5700 | 3.29 | | |
| 3 | 10.9496 | 2.09 | 1.92286 | 20.9 |
| 4 | 18.0475 | $D_4$ (variable) | | |
| 5 | ∞ (stop) | 0.40 | | |
| 6 | 6.4101 | 4.51 | 1.56384 | 60.7 |
| 7 | −12.4574 | 0.55 | 1.84666 | 23.8 |
| 8 | −194.5556 | 1.75 | | |
| 9* | 9.0815 | 1.00 | 1.68893 | 31.1 |
| 10* | 7.9363 | $D_{10}$ (variable) | | |
| 11* | 23.2221 | 1.72 | 1.56865 | 58.6 |
| 12* | −9954.0166 | $D_{12}$ (variable) | | |
| 13 | ∞ | 1.08 | 1.51680 | 64.2 |
| 14 | ∞ | | | | f = 6.5–21.4 mm  $F_{NO}$ = 2.9–5.6  2ω = 75.9°–25.0°

The lens surfaces with a * to the right of the surface number in Table 5 are aspheric lens surfaces, and the aspheric surface shape of these lens surfaces is expressed by Equation (A) above.

Table 6 below lists the values of the constant K and the coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_3$ | $A_4$ | $A_5$ | $A_6$ |
|---|---|---|---|---|---|
| 1 | 1.0343041 | −7.3743963E−4 | 2.6868807E−3 | −4.9548053E−4 | −6.6972376E−5 |
| 2 | −3.1590285 | −8.9012942E−4 | 4.2960044E−3 | −6.9820683E−4 | −9.4802045E−6 |
| 9 | 5.8470534 | −1.4566588E−3 | −7.1955290E−4 | −2.5901617E−4 | −2.6392541E−4 |
| 10 | −11.4740811 | −1.9429562E−3 | 5.0695370E−3 | −1.3592615E−3 | 5.1675229E−5 |
| 11 | 1.0068530 | −3.4380224E−3 | 8.1995770E−4 | 3.3370902E−4 | −2.5874128E−4 |
| 12 | 0.9847003 | −4.9538768E−3 | 3.4075383E−3 | −1.4756441E−3 | 3.8066861E−4 |

| # | $A_7$ | $A_8$ | $A_9$ | $A_{10}$ |
|---|---|---|---|---|
| 1 | 3.5361570E−5 | −5.1434720E−6 | 3.4199689E−7 | −8.9507458E−9 |
| 2 | 9.5535816E−6 | 3.3181005E−7 | −1.3318254E−7 | 3.4466571E−9 |
| 9 | 6.4897760E−5 | −4.8099062E−6 | −1.2605963E−6 | −1.9996422E−7 |
| 10 | −9.3622765E−6 | 2.7835884E−6 | 3.7131285E−8 | 3.6464083E−10 |
| 11 | 6.2279941E−5 | −4.4904995E−6 | −5.8434119E−7 | 7.9505063E−8 |
| 12 | −4.5791521E−5 | 2.2471336E−7 | 2.6860968E−7 | −4.4358639E−9 |

In the zoom lens of Embodiment 2, the first lens group $G_1$, the second lens group $G_2$, and the third lens group $G_3$ move during zooming. Therefore, the on-axis spacing $D_4$ between lens groups $G_1$ and $G_2$, the on-axis spacing $D_{10}$ between lens groups $G_2$ and $G_3$, and the on-axis spacing $D_{12}$ between the lens group $G_3$ and the filter unit 1 change with zooming. Table 7 below lists the values of the focal length f and the on-axis surface spacing $D_4$, the on-axis surface spacing $D_{10}$, and the on-axis surface spacing $D_{12}$ at the wide-angle end (f=6.5 mm), at an intermediate zoom position (f=11.8 mm), and at the telephoto end (f=21.4 mm).

TABLE 7

| f | $D_4$ | $D_{10}$ | $D_{12}$ |
|---|---|---|---|
| 6.5 | 20.20 | 7.23 | 4.39 |
| 11.8 | 8.41 | 11.28 | 6.24 |
| 21.4 | 3.19 | 24.57 | 3.73 |

The zoom lens of Embodiment 2 of the present invention satisfies Conditions (1)–(3) above as set forth in Table 8 below.

TABLE 8

| Condition No. | Condition | Value |
|---|---|---|
| (1) | $2.0 < |f_1|/f_w < 2.4$ | 2.15 |
| (2) | $0.29 < f_2/f_3 < 0.37$ | 0.33 |
| (3) | $2.7 < LT/(f_w \cdot Z \cdot \tan\omega) < 3.3$ | 2.95 |

Figures 3A, 3B, 3C, 3D:
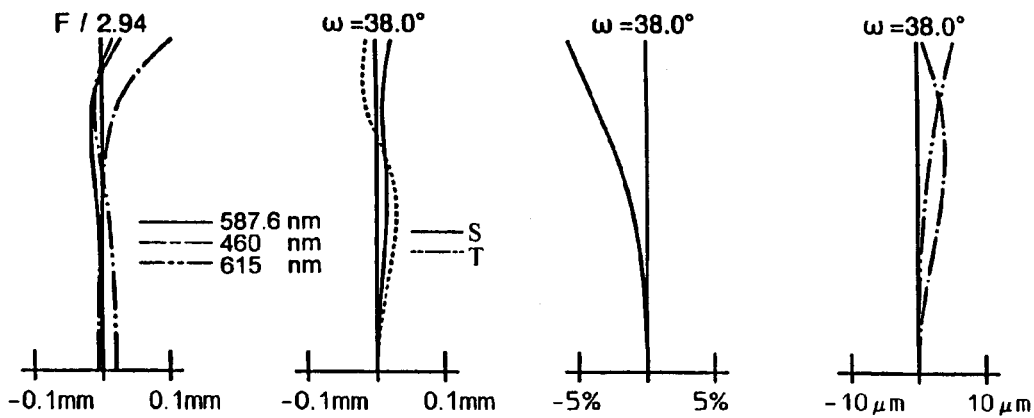
FIGS. 3A–3D show the spherical aberration, astigmatism, distortion, and lateral color, respectively, of the zoom lens according to Embodiment 2 at the wide-angle end.
Figures 3E, 3F, 3G, 3H:
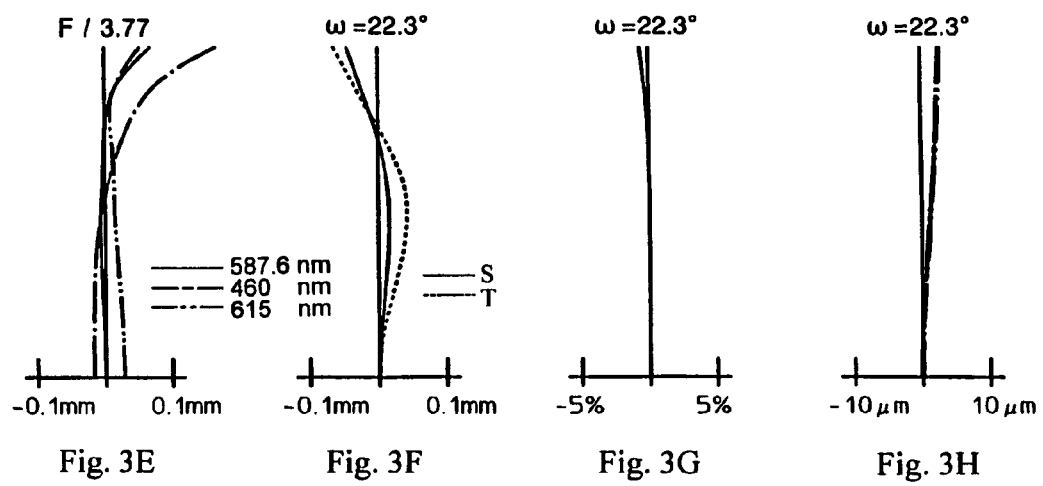
FIGS. 3E–3H show the spherical aberration, astigmatism, distortion, and lateral color, respectively, of the zoom lens according to Embodiment 2 at an intermediate position.
Figures 3I, 3J, 3K, 3L:
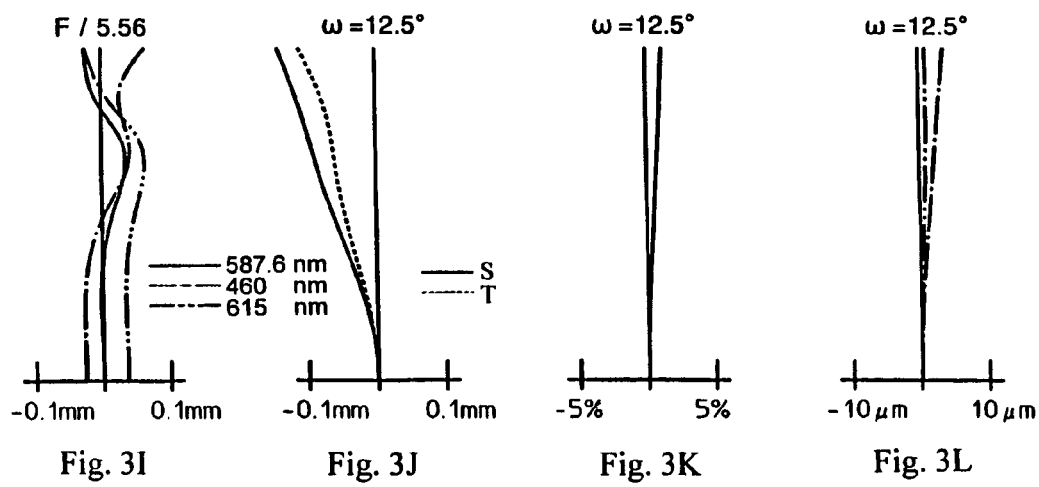
FIGS. 3I–3L show the spherical aberration, astigmatism, distortion, and lateral color, respectively, of the zoom lens according to Embodiment 2 at the telephoto end.

FIGS. 3A–3D show the spherical aberration, astigmatism, distortion, and lateral color, respectively, of the zoom lens of Embodiment 2 at the wide-angle end. FIGS. 3E–3H show the spherical aberration, astigmatism, distortion, and lateral color, respectively, of the zoom lens of Embodiment 2 at an intermediate position, and FIGS. 3I–3L show the spherical aberration, astigmatism, distortion, and lateral color, respectively, of the zoom lens of Embodiment 2 at the telephoto end. In FIGS. 3A, 3E, and 3I, the spherical aberration is shown for the wavelengths 587.6 nm (the d-line), 460 nm, and 615 nm. In the remaining figures, ω is the half-field angle. In FIGS. 3B, 3F and 3J, the astigmatism is shown for the sagittal image surface S and the tangential image surface T. In FIGS. 3C, 3G and 3K, distortion is measured at 587.6 nm (the d-line). In FIGS. 3D, 3H and 3L, the lateral color is shown for the wavelengths 460 nm and 615 nm relative to 587.6 nm (the d-line). As is apparent from these figures, the various aberrations are favorably corrected over the entire range of zoom.

The present invention is not limited to the aforementioned embodiments, as it will be obvious that various alternative implementations are possible. For instance, values such as the radius of curvature R of each of the lens components, the shapes of the aspheric lens surfaces, the surface spacings D, the refractive indices $N_d$, and Abbe numbers $v_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only three lens groups, arranged along an optical axis in order from the object side as follows:
   a first lens group having negative refractive power;
   a second lens group having positive refractive power and including a stop for controlling the amount of light that passes through the zoom lens;
   a third lens group having positive refractive power;
   wherein
   during zooming from the wide-angle end to the telephoto end, the first lens group moves first toward the image side and then toward the object side, the second lens group moves monotonically toward the object side and closer to the first lens group, the third lens group moves first toward the object side and then toward the image side, and the second lens group moves farther from the third lens group;
   with the zoom lens focused at infinity, the third lens group is closer to the object side at the wide-angle end than at the telephoto end;
   when focusing from infinity to close range, the third lens group moves toward the object side; and
   the following conditions are satisfied:

$2.0 < |f_1|/f_w < 2.4$ $0.29 < f_2/f_3 < 0.37$ where
   $f_w$ is the focal length of the entire zoom lens at the wide-angle end, $f_1$ is the focal length of the first lens group,
$f_2$ is the focal length of the second lens group, and
$f_3$ is the focal length of the third lens group.

2. The zoom lens of claim 1, wherein the following condition is satisfied:

$$2.7 < LT/(f_w \cdot Z \cdot \tan \omega) < 3.3$$

where
- LT is the distance along the optical axis from the object-side surface of the first lens group to the image plane of the zoom lens at the telephoto end;
- Z is the zoom ratio of the entire zoom lens, and
- ω is the half-field angle at the wide-angle end.

3. The zoom lens of claim 1, wherein the second lens group includes, arranged along the optical axis in order from the object side, a lens component that includes a biconvex lens element and a lens element having negative refractive power with its object-side surface concave and of greater curvature than its image-side surface, and a lens component having negative refractive power and having at least one aspheric surface.

4. The zoom lens of claim 3, wherein said lens component that includes a biconvex lens element consists of two lens elements and said lens component having negative refractive power consists of a lens element.

5. The zoom lens of claim 3, wherein the second lens group includes only three lens elements.

6. The zoom lens of claim 2, wherein the second lens group includes, arranged along the optical axis in order from the object side, a lens component that includes a biconvex lens element and a lens element having negative refractive power with its object-side surface concave and of greater curvature than its image-side surface, and a lens component having negative refractive power and having at least one aspheric surface.

7. The zoom lens of claim 6, wherein said lens component that includes a biconvex lens element consists of two lens elements and said lens component having negative refractive power consists of a lens element.

8. The zoom lens of claim 6, wherein the second lens group includes only three lens elements.

9. The zoom lens of claim 1, wherein the first lens group includes, arranged along the optical axis in order from the object side, a first lens component having negative refractive power, having at least one aspheric surface, and having a concave image-side surface of greater curvature than its object-side surface, and a second lens component having positive refractive power, having a meniscus shape, and having a convex object-side surface of greater curvature than its image-side surface.

10. The zoom lens of claim 9, wherein each of said first lens component and said second lens components consists of a lens element.

11. The zoom lens of claim 9, wherein the first lens group consists of two lens elements.

12. The zoom lens of claim 2, wherein the first lens group includes, arranged along the optical axis in order from the object side, a first lens component having negative refractive power, having at least one aspheric surface, and having a concave image-side surface of greater curvature than its object-side surface, and a second lens component having positive refractive power, having a meniscus shape, and having a convex object-side surface of greater curvature than its image-side surface.

13. The zoom lens of claim 12, wherein each of said first lens component and said second lens components consists of a lens element.

14. The zoom lens of claim 12, wherein the first lens group consists of two lens elements.

15. The zoom lens of claim 1, wherein the third lens group consists of a lens component having positive refractive power and having at least one aspheric surface.

16. The zoom lens of claim 15, wherein the third lens group consists of a lens element.

17. The zoom lens of claim 2, wherein the third lens group consists a lens component having positive refractive power and having at least one aspheric lens surface.

18. The zoom lens of claim 17, wherein the third lens group consists of a lens element.

19. The zoom lens of claim 3, wherein the third lens group consists of a lens component having positive refractive power and having at least one aspheric lens surface.

20. The zoom lens of claim 19, wherein the third lens group consists of a lens element.

* * * * *

UNITED STATES PATENT AND TRADEMARK OFFICE
CERTIFICATE OF CORRECTION

| | | |
|---|---|---|
| PATENT NO. | : 7,046,452 B2 | Page 1 of 1 |
| APPLICATION NO. | : 10/936770 | |
| DATED | : May 16, 2006 | |
| INVENTOR(S) | : Ori | |

It is certified that error appears in the above-identified patent and that said Letters Patent is hereby corrected as shown below:

Col. 12, line 9
Change "second lens components" to - - second lens component - -.

Signed and Sealed this

Twenty-second Day of August, 2006

JON W. DUDAS
*Director of the United States Patent and Trademark Office*